United States Patent [19]

Simon et al.

[11] Patent Number: 5,451,980
[45] Date of Patent: Sep. 19, 1995

[54] LIQUID CRYSTAL FLAT PANEL COLOR DISPLAY WITH SURFACE PLASMON SCATTERING

[75] Inventors: H. J. Simon; Yu Wang, both of Toledo, Ohio

[73] Assignee: The University of Toledo, Toledo, Ohio

[21] Appl. No.: 138,925

[22] Filed: Oct. 19, 1993

[51] Int. Cl.6 ............................................. G09G 3/36
[52] U.S. Cl. ...................................... 345/88; 345/32; 359/40
[58] Field of Search ................... 345/63, 32, 102, 88, 345/89, 72, 147, 87; 359/48, 49, 64, 40

[56] References Cited

U.S. PATENT DOCUMENTS

| | | | |
|---|---|---|---|
| 4,487,481 | 12/1984 | Suzawa | 345/102 |
| 4,686,519 | 8/1987 | Yoshida et al. | 345/88 |
| 5,142,388 | 8/1992 | Watanabe et al. | 345/88 |
| 5,157,541 | 10/1992 | Schildraut et al. | |
| 5,278,545 | 1/1994 | Streck | 345/102 |
| 5,347,395 | 9/1994 | Lauterschlager et al. | |

Primary Examiner—Ulysses Weldon
Assistant Examiner—Regina Liang
Attorney, Agent, or Firm—Marshall & Melhorn

[57] ABSTRACT

A flat panel color display is provided in which white collimated light incident on a light coupling means having a metal layer and a liquid crystal layer formed on a surface of the coupling means produces a colored spot of light at the interface of the metal layer and liquid crystal layer through the excitation of surface plasmons. The present invention utilizes the color selective scattering of incident white light by surface plasmons and includes a coupling device, such as a high index glass prism, with a metal film layer and a liquid crystal layer formed on the coupling device. Surface plasmon waves can be generated at a negative dielectric (metal layer)-positive dielectric (liquid crystal layer) interface when the dispersion relationship is satisfied. The incident white light includes photons which have frequencies approximately equal to the plasmon resonance, and such photons are strongly scattered. Photons having a frequency other than the plasmon resonance will be totally reflected. The dispersion relationship of the metal-liquid crystal interface depends on the dielectric constant of the metal, which is not typically variable, and the dielectric constant of the liquid crystal, which is variable. An external voltage control/modulator may be used to vary the dielectric constant of the liquid crystal, thereby controlling the plasmon resonance condition and the frequencies (color) of the scattered photons.

17 Claims, 4 Drawing Sheets

LIQUID CRYSTAL FLAT PANEL COLOR DISPLAY WITH SURFACE PLASMON SCATTERING

BACKGROUND OF THE INVENTION

1. Field of the Invention

The present invention relates to a liquid crystal flat panel color display, and more particularly, to a flat panel color display which includes a light source, a prism, a layer of metal film, a layer of liquid crystal, an array of transparent electrodes, a glass display screen, and a controller for controlling the electrodes to selectively vary the dielectric constant of the metal-liquid crystal interface. The variance of the dielectric constant changes the plasmon resonance condition and controls the color of light directed to the display screen through the selective scattering of incident white light by surface plasmons.

2. Summary of Related Art

In recent years, a considerable amount of research has been conducted in an attempt to develop a low profile, full color electronic display system which does not rely upon conventional cathode ray tube technology. Such "flat panel screens" are used in a variety of applications, including lap top computers and aviation instrument panels. Additional applications are being developed, including computer terminals, automobile instruments, high definition television and medical instruments.

At this time, there are a number of cost, production, and design difficulties which are limiting the use of flat panel screens in the various applications. New flat panel screen technologies are needed to reduce the cost of, improve the performance of, and simplify the manufacturing process for the flat panel screens. Because flat panel screens have space and layout advantages over the present cathode ray tubes, the market for flat panel screens will continue to grow as the improved flat screen technology overcomes the cost and production difficulties. Cathode ray tubes typically have large depth dimensions and consequently occupy a considerable amount of floor or counter space. Because cathode ray tubes require an elongate neck to provide for the acceleration of an electron beam from the electron gun to the face plate of the cathode ray tube, the tubes are quite irregular in shape. Cathode ray tubes are constructed from relatively thick glass and are inordinately heavy, extremely fragile and easily breakable. Cathode ray tubes also require a relatively high voltage power supply to accelerate the electron beam and sustain the displayed image, and such a power supply is not typically available in portable applications.

In a cathode ray tube, an electron beam is deflected through a prescribed angle as it leaves the gun. The electron beam strikes the inside of the glass screen, which is coated with a phosphorescent dot material that emits light when struck by the electron beam. The electron beam is swept rapidly and repeatedly across the cathode ray tube screen to produce a screen of varying intensity rather than a sequence of discrete dots. In a black and white tube, white dots are used and the luminance is varied to achieve shades of gray. In a color tube, three different color phosphorescent dots (red, blue, and green) are used to achieve the various colors, including white.

The color picture tube contains three separate electron guns that produce three different scanning beams simultaneously. The beam from the red gun strikes a red phosphor dot on the tube to cause the dot to glow red. Blue and green dots are struck by their respective electron beams. The viewer, at a distance from the display screen, sees a single color that is a combination of red, blue, and green. The dots are arranged in a two-dimensional matrix field of the display screen.

The term "pixels" is used herein as a generic term for picture elements or picture dots in a display screen, such as the phosphorescent dots in the cathode ray tube, which are arranged in the rows and columns of the matrix. A high definition color screen may have over one million pixels (a matrix of 1024 pixels by 1024 pixels).

A number of different technologies are being developed to overcome the space problems of the cathode ray tube and to facilitate the continued development of the flat panel displays. Liquid crystal, gas plasma, laser/LED, and field-emitters are presently considered the most promising.

In the gas plasma devices, an electric current causes a miniature tube of gas at each pixel to glow. The laser/LED devices utilize miniature laser beams or light emitting diodes to directly illuminate the individual pixels. In a field-emitter display, arrays of microscopic cathodes are aimed at a phosphor dots on the screen to cause the dots to glow.

The primary form of flat panel screen in use at this time is the active matrix liquid crystal display. Liquid crystal displays are typically either reflective or transmissive. A reflective liquid crystal display depends upon ambient light conditions in order to be viewed. Light from the surrounding environment incident upon the side of the display facing the viewer is reflected back to the viewer. Differences in the orientation of the liquid crystal material within each liquid crystal pixel cause those pixels to appear either darkened or transparent. Reflective liquid crystal applications are severely limited because they cannot be used in a dark or low light environment.

Transmissive liquid crystal displays require the use of one or more back lights. Transmissive liquid crystal displays disclosed in the prior art still utilize the three color system of phosphorescent dots. A liquid crystal surface acts as a shutter to block light or allow light to pass through the layer of liquid crystal to lighten each pixel (phosphorescent dot) on the screen. A transistor-electrode at each pixel activates the liquid crystal shutter. The present invention is directed to the field of backlit liquid crystal displays in which the phosphorescent dots are not utilized and color is provided by the scattering of color light in the surface plasmon mode.

The liquid crystal, gas plasma, and field-emitters technologies are similar in that they all rely on a matrix of electrodes. Electrical signals applied to the matrix of electrodes control a working medium. Commonly used working mediums include liquid crystals, neon and phosphors. The working medium is typically sandwiched between the matrix of electrodes. The light emitted from a screen pixel is regulated by energizing its associated electrodes. If the proper electrical signals are rapidly applied to the electrodes, still and moving images can be formed.

To achieve a colored screen in a cathode ray tube display, three separate electron guns are used to energize phosphorescent dots on the inside of the display screen. The dots are arranged in an alternating color pattern in order to facilitate the combination of the blue, red, and green dots to form the various colors on the screen.

In flat panel displays, the color systems have not reached the level of color performance of cathode ray tube displays for color television. Color filters and color screens have been used to provide the combination of blue, red, and green dots needed for color displays. Wave guides are often used to collimate light and to transmit light to the desired locations on a display screen. Color filters may be used to limit the color of light being transmitted in a wave guide. The "filtering" of light into one of the three primary colors prior to entry into the wave guide permits a display screen to utilize a plurality of wave guides with filtered light to display color images. The control and operation of the color displays is very complex for flat panel applications, and researchers have been working to develop an improved color display system for flat panel applications.

In the design of flat panel displays having a back light system, there are a number of design features and specifications which must be addressed to provide a viable flat panel display. The lighting intensity should be uniform across the large surface areas illuminated by the back light. The intensity of the light must be substantially the same at each pixel of the liquid crystal display. The back light must also provide high brightness illumination to yield a sharp image to a remotely positioned viewing audience. The back light system must maintain a low profile, which requires the liquid crystal display to be substantially flat.

The design of the back light system should take into consideration the number and configuration of the back lights. Heat is often a problem in flat panel displays. Power consumption is also a concern, especially in portable systems which are battery operated. Improving the efficiency of the back light system for a liquid crystal display helps to reduce heat generation and power consumption.

U.S. Pat. No. 4,992,916 to Henkes discloses an illuminator for a flat panel display which includes at least one light source and at least one prism having total internal reflection at all but its front surface. The light source is located within a prism to provide a thin and efficient optical cavity. The total internal reflection provides multiple images of the associated light source at the front surface.

U.S. Pat. No. 5,083,120 to Nelson shows a flat panel display utilizing an array of sequentially illuminated leaky guide lights as the row-back light component of the display. Light is directed into the guide and is designed to leak light in a uniform manner along the longitudinally extending edge of the guide.

Wave guides for flat panel screen applications are disclosed in U.S. Pat. No. 5,106,181 to Rockwell. Fiber optic wave guides are placed in parallel across the substrate to determine either the row or column resolution of the display. The wave guide is tapped to cause the light to exit the wave guide and illuminate the screen. Filters are used to convert white light into color light to make a full color display.

U.S. Pat. No. 5,161,041 to Abileah et al. teaches a lighting assembly for a backlit flat panel display. The lighting assembly includes an integrally formed image splitting and collimating lens for enlarging the area illuminated by the lamps.

SUMMARY OF THE INVENTION

In accordance with the present invention, there is provided a flat panel color display in which white light incident on the front face of a prism produces a colored spot of light at the interface of the silver film and liquid crystal through the excitation of surface plasmons.

The present invention utilizes the color selective scattering of incident white light by surface plasmons and includes a coupling device, such as a high index glass prism, with a metal film layer and a liquid crystal layer formed on the coupling device. Surface plasmon waves can be generated at a negative dielectric (metal layer)-positive dielectric (liquid crystal layer) interface when the dispersion relationship is satisfied. The surface plasmon waves include photons which have frequencies approximately equal to the plasmon resonance, and such photons are strongly scattered. Photons having a frequency other than the plasmon resonance will be totally reflected.

The dispersion relationship of the surface plasmon mode at the metal-liquid crystal interface depends on the dielectric constant of the metal, which is not typically variable, and the dielectric constant of the liquid crystal, which is variable. A matrix of electrodes is used to define the pixels for the flat panel display, and an external voltage control/modulator sequentially varies the dielectric constant of the liquid crystal for each pixel, thereby controlling the plasmon resonance condition and the frequencies (color) of the scattered photons. No further working medium is required. The desired color for each pixel is created by the scattered light and is transmitted directly to the viewer for viewing.

In addition to the color control, the display system may also include an intensity modulator to control the luminance of the display screen. A liquid crystal layer and a matrix of transparent electrodes create an array of polarizer cells which are controlled by an external voltage signal. The incident light and the scattered light are polarized. By transmitting voltage signals to change the direction of the individual polarizer cells, the luminance of the display screen may be controlled.

The intensity modulator and the color modulator components may be combined into a single apparatus to provide improved performance of the flat panel display device.

A number of different light coupling means may be used for excitation of the surface plasmon mode by the light source. The high index prism is the preferred method, but space problems occur as the size of the display screen increases. Planar diffraction gratings may also be used for excitation of the surface plasmon mode.

An object of the present invention is to provide a flat panel display screen which obtains the desired color pattern by the selective scattering of light directly from a surface plasmon mode of a metal-liquid crystal interface to the viewing screen. One pixel can provide a color response across the full color spectrum and eliminates the need for a three color pixel system.

An additional object of the present invention is to increase optical transmission of light and to provide for wide angle viewing.

An object of the present invention is to provide a low cost flat panel color display which can be produced in a manufacturing operation utilizing known production techniques. The display will provide a high degree of reliability and an acceptable color picture output for a majority of applications.

A further object of the invention is to provide a flat panel screen which provides color operation without increasing the depth of the overall display. Maintaining a thin profile is an essential requirement for flat panel displays.

An additional object of the present invention is to combine an intensity modulator and a color modulator into a single flat panel display device to improve the intensity control of the flat panel display device.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 provides color scattering first and intensity modulation second, and FIG. 3a shows intensity modulation first and color scattering second;

DESCRIPTION OF THE PREFERRED EMBODIMENT

The color display modulator 10 of the present invention utilizes the color selective scattering of white light by surface plasmons to produce a color display.

Figure 1:
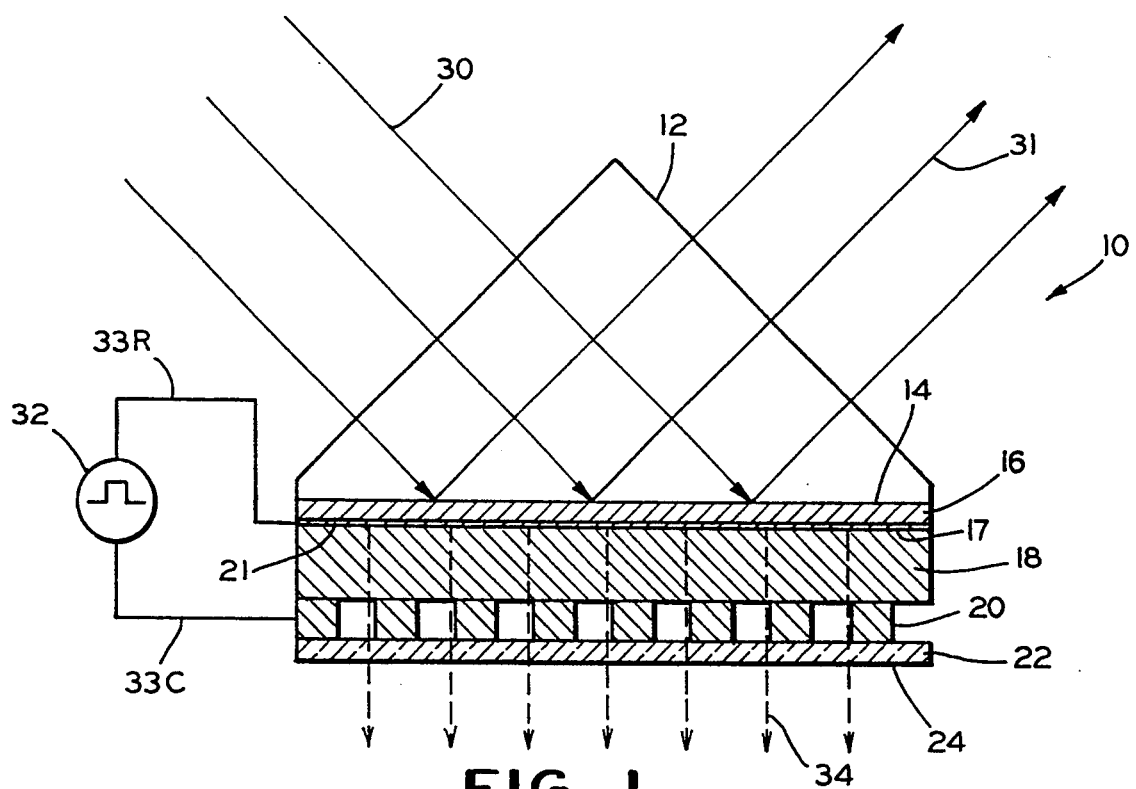
FIG. 1 is a schematic sectional view of a flat panel modulator illustrating the components present in the liquid crystal display of the present invention, the layer thickness of the components being exaggerated for ease of viewing.

The cross-sectional view of the modulator 10, as shown in FIG. 1, provides a prism 12 with multiple layers of material deposited to the hypotenuse 14 of the prism 12. The prism 12 is a high index glass prism. The first layer on the hypotenuse 14 of prism 12 is a metal layer 16 of silver, aluminum, or other metals with the desired dispersion properties in the surface plasmon mode.

The second layer deposited on the hypotenuse 14 of the prism 12 is a liquid crystal layer 18, which provides the variable dielectric layer of the metal-liquid crystal interface 17 for plasmon scattering. The liquid crystal layer 18 may consist of an aligned super-twist nematic liquid crystal.

Adjacent the liquid crystal layer 18 is an column array of transparent electrodes 20. The outer layer shown in FIG. 1 is a thin panel of glass 22 having an outer surface 24 facing the viewer of the display. The glass panel 22 is used to structurally secure the liquid crystal layer 18, and to secure and position the electrodes 20 in relationship to the liquid crystal layer 18. The glass panel 22 is typically an ITO coated glass substrate.

An ordered liquid crystal layer 18 attached to an ordered structure is required to permit the liquid crystal layer 18 to selectively change its dielectric constant with an applied voltage. On the metal layer 16 side, this may be achieved by evaporating the metal film at a large oblique angle above approximately 85 degrees. On the electrode 20—glass panel 22 side, the ordered structure is achieved by rubbing grooves in a thin polyamide layer placed on the ITO glass substrate 22.

A series of parallel, linear conductors 21 are etched or otherwise formed on the planer metal layer 16 to form a row array of electrodes. The transparent electrodes 20 are in a parallel plane on the opposite side of the liquid crystal layer 18. The transparent electrodes 20 are parallel, linear conductors forming a column array perpendicular to the row array of conductors 21. The rows of electrodes 21 and the columns of electrodes 20 form a matrix 26 which defines a plurality of pixels 28 at the crossover point or intersection 27 of the row electrodes 21 and the column electrodes 20. For example, in a display screen having a matrix of 250 electrodes by 250 electrodes, approximately 62,500 pixels 28 are defined. The formation of the matrix 26 could obviously be reversed, with electrodes 21 being the columns and the electrodes 20 being the rows.

A voltage signal is transmitted through the liquid crystal layer 18 at the intersections 27 in a controlled sequence to change the dielectric constant of the liquid crystal at the pixel 28, which controls the color of the light scattered at the junction of the metal layer 16 and the liquid crystal layer 18.

Figure 2:
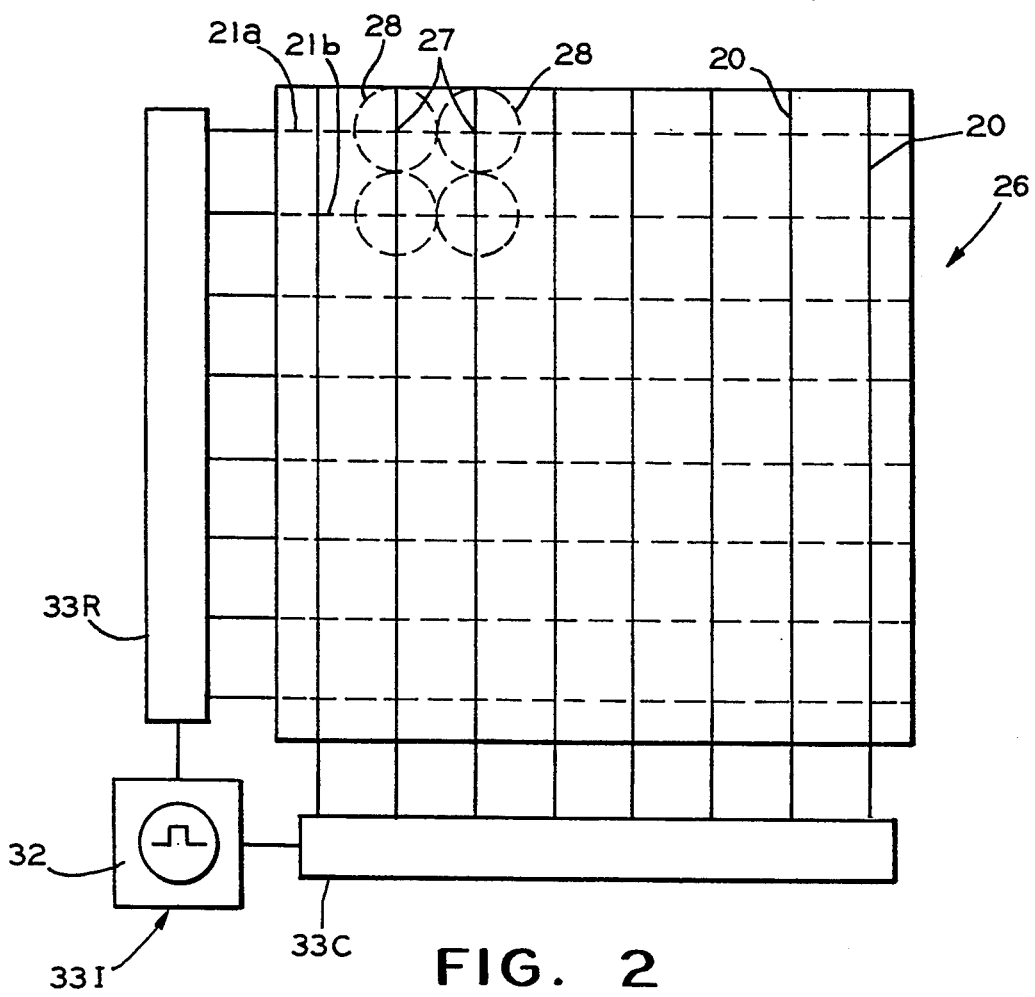
FIG. 2 is a schematic front elevational view of the transparent electrodes, one array of linear electrodes positioned on the top side of the layer of liquid crystal, a second linear array formed in the metal layer below the layer of liquid crystal such that the crossover points of the two arrays form pixels, and the color modulator for supplying voltage signals to the electrodes through the layer of liquid crystal for changing the dielectric constant of the liquid crystal.

In FIG. 2, control signals are generated by the color modulator 32, which is connected to the row electrodes 21 in metal layer 16 by conductor 33R and the transparent column electrodes 20 by conductor 33C. Color modulator 32 addresses each of the row electrodes in sequence. When the first row 21a is activated, the column electrodes 20 are independently addressed simultaneously by the color modulator 32 to cause the liquid crystal material at each intersection 27 defined by an activated row and an addressed column to scatter light to the viewer, depending on the nature of the electrical signal applied by the color modulator 32.

After each of the electrode columns 20 have been addressed while electrode row 21a is activated, electrode row 21a is deactivated, row 21b is activated, and each of the electrode columns 20 are addressed. When voltage is transmitted through the layer of liquid crystal 18 at the intersection 27, the dielectric constant of the liquid crystal layer is increased at that point (pixel 28) in the liquid crystal layer 18. Each of the rows 21 are activated in sequence to create picture elements, pixels 28, which form the desired display image on the surface 24. The rows of electrodes 21 and columns of electrodes 20 are repeatedly sequenced at an appropriate rate in a known manner for forming the display image.

The white incident light 30, as shown in FIG. 1, is provided from a back light source. In order to facilitate the generation of the surface plasmons, the white incident light 30 is collimated in a plane wave and p-polarized.

Initially, the prism 12 is positioned so that the incident angel is approximately equal to or slightly greater than the plasmon angle such that no photons in the visible range will be absorbed and scattered, and the surface 24 of the glass 22 will show no color. All of the light is reflected light 31 which is reflected away from the surface 24 at the hypotenuse 14 of the prism 12.

As the dielectric constant of the liquid crystal layer 18 for a pixel 28 is increased, photons are brought into plasmon resonance and the outer surface 24 of the display glass 22 shows a color spot. As the voltage signal from the color modulator 32 is increased and the resulting dielectric constant of the liquid crystal for a pixel 28 is increased, the light 34 is absorbed and scattered on the outer surface 24 to show a different color of the spectrum depending on the external control voltage signal from the color modulator 32. The incident white light 30 is partially reflected light 31 and the remainder is absorbed and scattered light 34 directed to the outer surface 24.

The incident white light 30 may initially be tuned to the angle for excitation of the surface plasmon mode in the red part of the spectrum such that the scattered light 34 is red. Under such condition, a red spot of scattered light 34 originating from the inherent surface roughness at the metal-liquid crystal interface 17 will be projected in the direction of the viewer. All of the remaining colors in the white light are reflected away from the hypotenuse side 14 of the prism 12, shown as reflected light 31 in FIG. 1.

When a voltage is applied across the liquid crystal layer 18 to change the dielectric constant, the surface plasmon mode condition will be changed to another color in the spectrum, such as green, and a green spot of scattered light 34 is seen on the screen 24. An additional increase in the voltage applied to the liquid crystal layer 18 changes the resonant spot to blue.

As noted above, the rows of electrodes 21 in matrix 26 are addressed in sequence and the columns of electrodes 20 are independently addressed simultaneously by the color modulator 32 to cause the liquid crystal at each intersection 27 to produce the value of index of refraction to scatter the color light, determined by the plasmon resonance, to the viewer facing the outer surface 24. The variance of the electrical signals transmitted from the color modulator and applied to the row electrodes 21 and column electrodes 20 alter the orientation, and thus the index of refraction and dielectric constant, of the liquid crystal 18.

The pixels 28 in a display must be updated at a very high rate to provide a color display. By systematically controlling the color modulator 32 in a two-dimensional matrix array 26, still and moving images can be formed by the scattered light 34 at the pixels 28.

The signals received at a conventional color display are separated into three distinct signals for red, green, and blue pixels. The three different color-types of pixels are arranged on the screen such that a full spectrum of colors may be obtained on the screen by controlling the signals from three electron guns to the three different types of pixels. In the present invention, one pixel 28 provides a full spectral range of color, which eliminates the need for three different types of color pixels. Upon receipt of a video input signal, the color modulator 32 in the present invention generates a control voltage signal to the electrodes 20, 21 for controlling the dielectric constant of the liquid crystal at each of the pixels 28 and the resulting scattering of color light to the outer surface 24.

Figure 3:
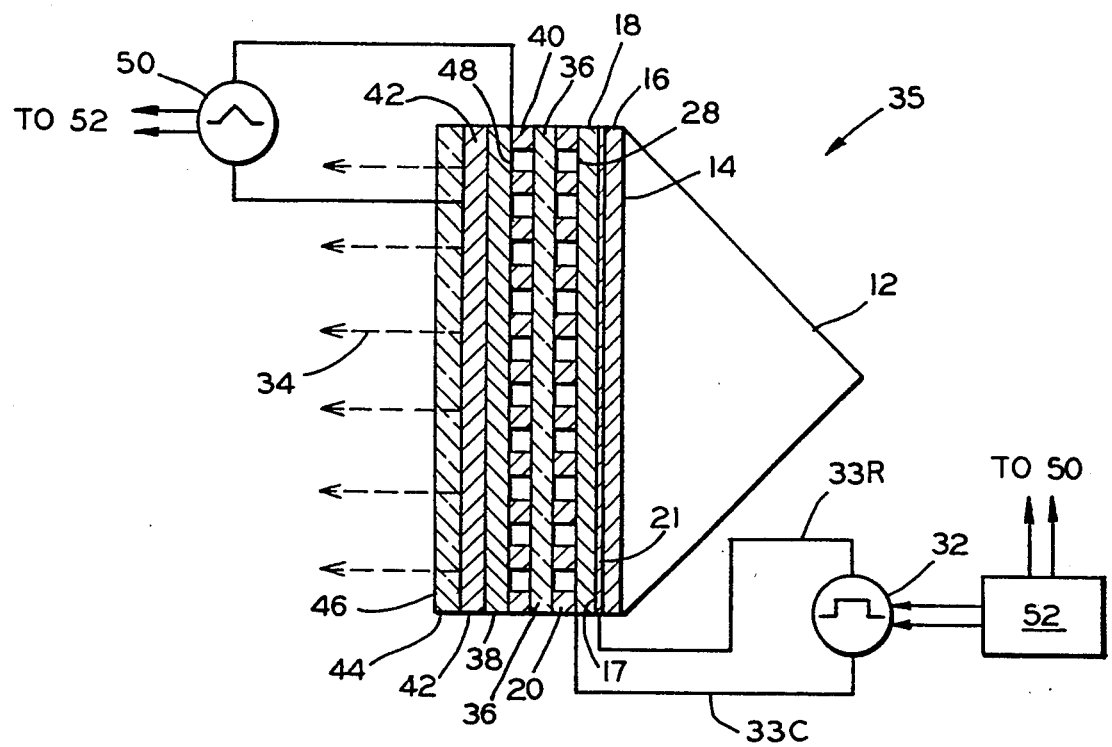
FIG. 3 and 3a are schematic sectional views of the flat panel display device showing the components for a combination color modulator and intensity modulator, the layer thickness of the components being exaggerated for ease of viewing.
Figure 3A:
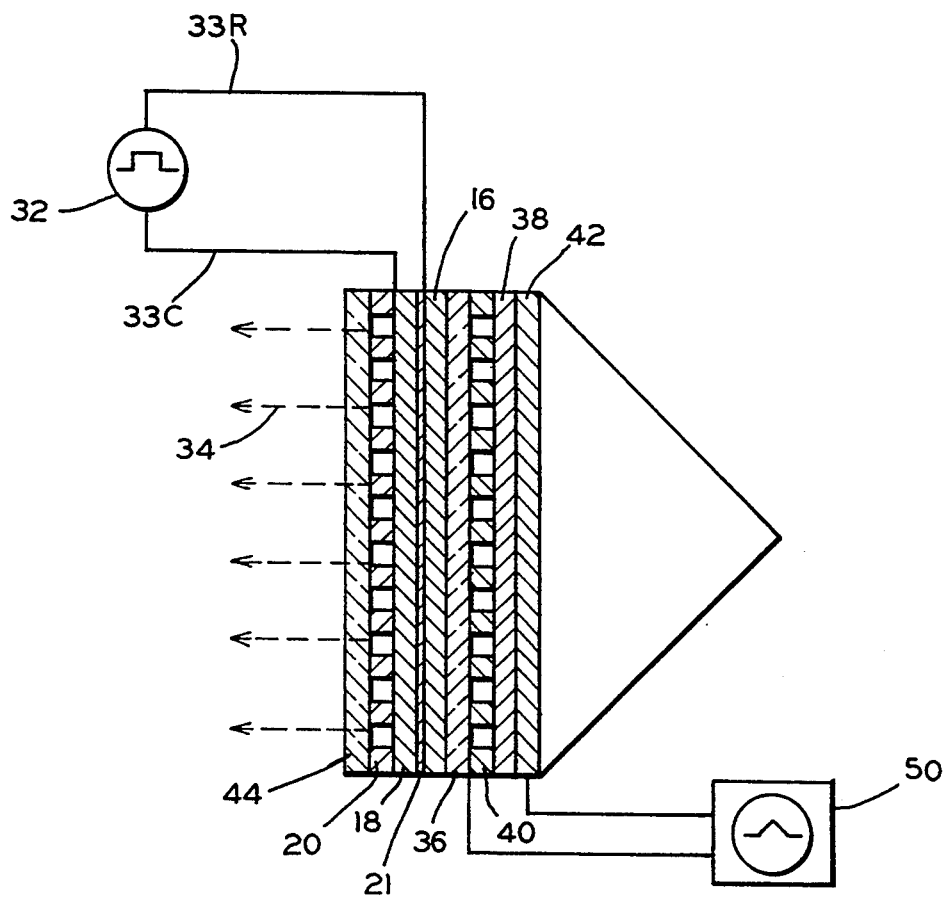

In FIGS. 3 and 3a, intensity modulating components have been added to the color modulator 10 shown in FIG. 1 to provide a flat panel display 35 including both color modulation by the color modulator 32 and intensity modulation by the intensity modulator 50. The prism 12, the metal layer 16, the row electrodes 21, the liquid crystal layer 18, and the transparent column electrodes 20 are identical to the components shown in FIG. 1. A glass layer 36 separates the three color modulating layers from the three intensity modulating layers.

The intensity modulating layers shown in FIG. 3 include a liquid crystal layer 38 positioned between two arrays of transparent electrodes 40, 42. The outer layer is a layer of glass 44 with a display surface 46 facing the viewers of the flat panel display 35. The glass layers 36, 44 are used to secure and position the arrays of electrodes 40, 42.

One array of transparent electrodes 42 includes parallel, linear conductors forming a row array of electrodes. The other array of transparent electrodes 40 are parallel, linear conductors forming a column array perpendicular to the row array of conductors 40. Electrodes 40 and electrodes 42 form an intensity matrix similar to the color matrix 26 such that crossover points-intersections in the intensity matrix are aligned with the intersections 27 in the color matrix 26.

The pixels 48 formed in the liquid crystal layer 38 by the electrodes 40, 42 in the intensity matrix operate as a polarizer, and the selective direction of the polarization of the liquid crystal layer 38 is controlled by an external voltage from an intensity modulator 50 as shown in FIGS. 3 and 3a. The intensity modulator 50 controls the voltage transmitted through the liquid crystal layer 38 between row electrode array 42 and column electrode array 40.

Because of the alignment of the intensity matrix and the color matrix 26, the pixels 48 of the intensity matrix are also aligned with the pixels 28 of the color matrix such that a single pixel is displayed for viewing. The color modulator 32 and the intensity modulator 50 are synchronized to energize the commonly aligned pixels at the same time.

Since the surface plasmon mode can be excited only by p-polarized light, the scattered light projected by the surface plasmons at the metal-liquid crystal interface 17 is also p-polarized. By changing the direction of the tiny polarizers in layer of liquid crystal 38 positioned between electrode arrays 40, 42, the intensity of the image projected by display 46 may be changed. Thus the color modulator 32 controls color and the intensity modulator 50 simultaneously controls the intensity of the pixels for the flat panel display 35 shown in FIGS. 3-3a.

In FIG. 3, the light is color scattered first and then intensity modulated second. In FIG. 3a, the reverse occurs. The light is intensity modulated first and color scattered second. The configuration in FIG. 3, with the intensity modulation occurring after the color scattering, provides effective intensity modulation for light traveling nearly perpendicular to the interface 17. This limits the wide angle viewing effectiveness of this configuration.

An alternative configuration is shown in FIG. 3a, in which the intensity modulation layers are placed between the hypotenuse 14 of the prism 12 and the metal layer 16. The polarization effect of the liquid crystal layer 38 and the scattering of color light at the interface 17 between the metal layer 16 and the liquid crystal layer 18 would occur in the same manner noted above.

Time response of the liquid crystal layer 38 becomes a concern relative to the maximum permissible flicker time of the display. In most flat panel systems, the color picture signal is an amplitude modulated signal. In the present system, the use of an amplitude modulated signal for the intensity, and a frequency or pulse modulated signal for the color, provides an alternative means for improving the performance of the present invention. The control circuits 52, which may include such components as the receivers, drivers, amplifiers, separators to separate the intensity and color signals, color decoder, and other control circuits necessary for receiving and processing signals to the display 35, can be designed to transmit the desired signals to the color modulator 32 and the intensity modulator 50.

In developing a liquid crystal flat panel display with surface plasmon scattering, an important concern is the liquid crystal response. A large index change across the visible spectrum with applied voltage is important. In addition, a suitably low index of refraction is required. In considering the thickness of the liquid crystal, a thin layer is acceptable because the evanescent field of the surface plasmon mode penetrates only a fraction of a wavelength into the liquid crystal.

For the liquid crystal to respond to the applied voltage, the liquid crystal molecules must all be aligned nearly parallel to the surface. This is generally accomplished by rubbing grooves in a thin polyamide layer placed on the ITO glass substrate 22. The liquid crystal layer 18 must be aligned on the metal layer 16. One method for producing the alignment is by means of metal evaporation at a high oblique angle of approximately 85 degrees.

The choice of metal greatly influences the color properties of the surface plasmon mode. Silver has a strong resonant response in the red part of the spectrum. The short wavelength limit of the surface plasmon mode is determined by the bulk plasmon frequency, which may limit the blue response for the silver-liquid crystal interface. Aluminum is another acceptable metal since its surface plasmon response extends into the near ultraviolet part of the spectrum. However, the surface plasmon characteristics of aluminum are not as resonant as those of silver. In addition to the composition of the metal, the thickness and the surface roughness of the metal also effect the intensity of the color response.

By appropriate selection of liquid crystal materials, metal films, and high index prisms (or diffraction gratings), the optical efficiency, contrast ratio, grey scale control, and spectral characteristics may be optimized for the requirements of the specific application. The entire spectrum of color is available in the present invention from the scattered light 34 originating from a single pixel 28 on the surface plasmon flat panel display. Separate red, green and blue phosphor dot pixels are not needed to achieve a color display. Neither are the red, green, and blue filters required for a color display.

Figure 4:
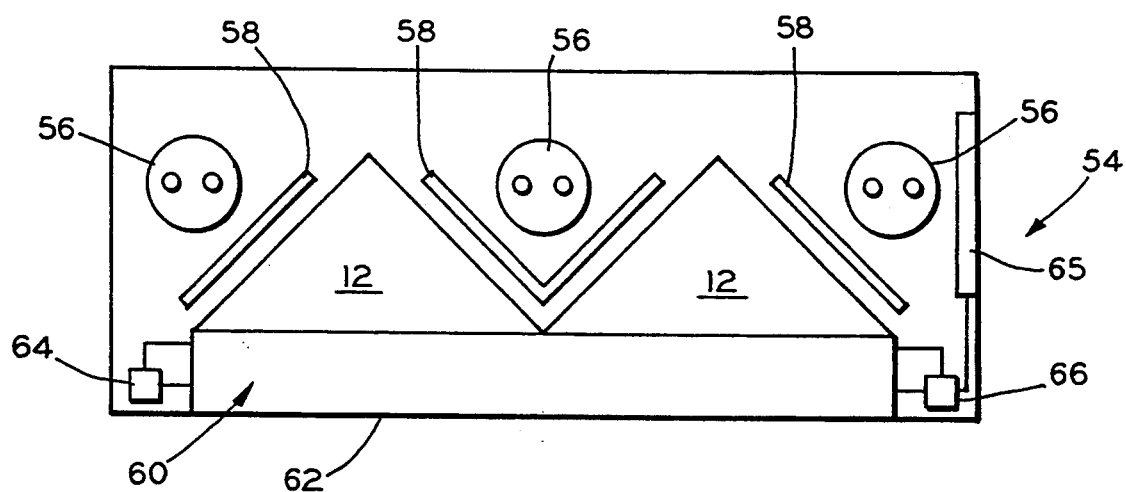
FIG. 4 is a schematic cross-sectional top view of a flat panel display utilizing a prism as the coupling means for excitation of the surface plasmon mode.

FIG. 4 shows a display 54 having a plurality of florescent back lights 56 with polarizing filters 58 to p-polarize the incident light entering the prisms 12. The layers of metal, liquid crystal, electrodes, and glass of the flat panel display 35 in FIG. 3 are represented by modulator panel 60 in FIG. 4. Modulator controls 64, 66 and control circuits 65 receive and process signals to control the matrix of electrodes for both the color portion and the intensity portion of the modulator panel 60 in a manner described above.

Figure 5:
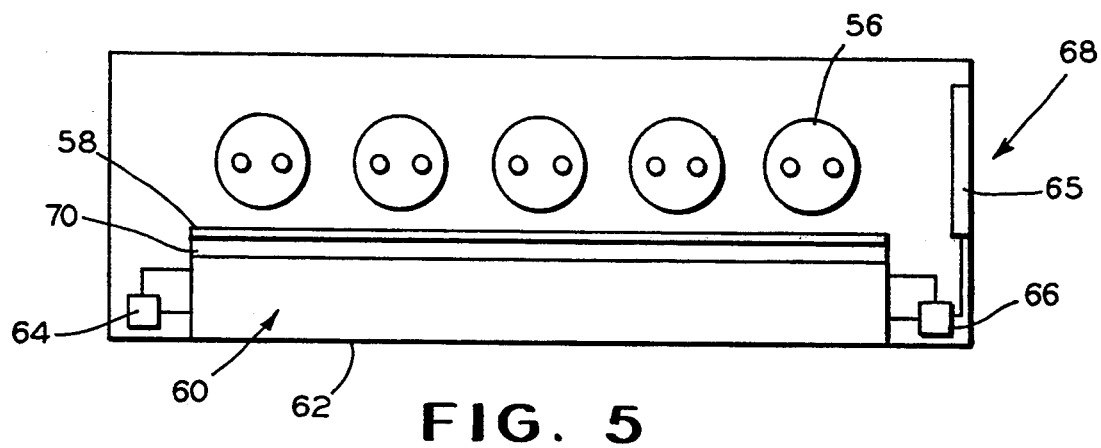
FIG. 5 is a schematic cross-sectional top view of a flat panel display utilizing a grate as the coupling means for excitation of the incident light.

In FIG. 5, the display 68 includes a grating coupling 70, instead of the prisms 12, to provide a light coupling relationship to the source of light. Because the grating coupling 70 is thinner than the prisms 12, the overall thickness of the display 68 is smaller than the thickness of the prism coupling display 54.

Figure 6:
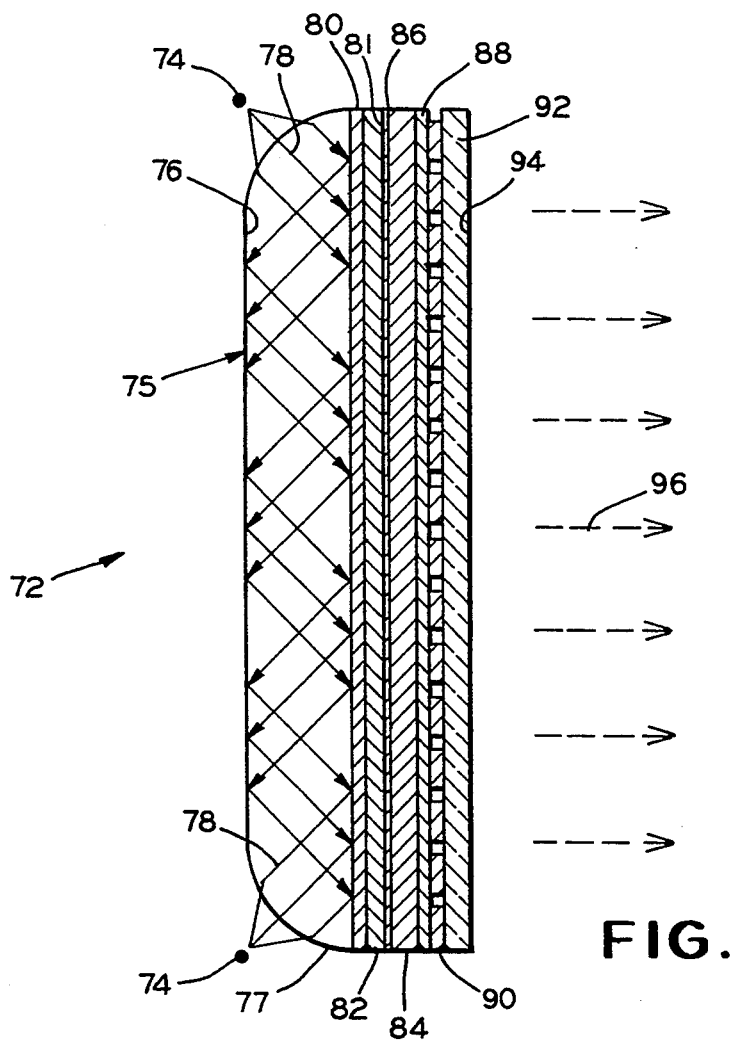
FIG. 6 is a schematic sectional view of the flat panel modulator illustrating the use of a wave guide device for excitation of the incident light, the layer thickness of the components being exaggerated for ease of viewing.

A wave guide device may also be used to obtain the incident optical excitation, as shown in display 72 in FIG. 6. The utilization of the wave guide 75 reduces the number of florescent lights 74 or other light sources for a back light apparatus. The use of fewer lights reduces both the size of the display 72 and the amount of electrical power needed to illuminate the lights 74 in the display 72.

The wave guide 75 consists of a high index flat plate glass or other similar device may be used for the wave guide. The light source 74 is placed along the outside edges 77 of the wave guide 75, which act as condensing lenses for the input of the light 78 from the source 74. The light 78 becomes a collimated beam after passing through the condensing lenses 77.

A layer of partial reflecting film 80, which functions as a beam splitter, is positioned on the wave guide 75 adjacent to the layer of metal film 82. A portion of the light 78 is passed through the layer of metal film 82 and the balance is reflected back to the glass-air interface 76. Because the angle of incidence for exciting the surface plasmons is greater than the angle for total internal reflection and the surfaces of the glass at interface 76 and partial reflecting film 80 are parallel, the light reflected from the partial reflecting surface 80 to the surface 76 will be reflected back to the partial reflecting surface 80 at the same angle of incidence on subsequent passes. Although the intensity of the light 78 diminishes monotonically across the wave guide 75, the use of a second light 74 on the opposite side results in a reasonably uniform illumination.

The display 72 includes the liquid crystal layer 84 and the plasmon mode interface 86 similar to the previous embodiments. A series of parallel, linear conductors 81 are etched or otherwise formed on the planer metal layer 82 to form a row array of electrodes. A transparent aligning layer 88 is used to position the liquid crystal layer 84, the column array of transparent electrodes 90, and the outer glass display screen 92. The scattered light 96 generated at interface 86 passes through the outer surface 94 of the screen 92 for viewing.

The present invention has a number of advantages over color display systems currently in use. A complete response over the full spectral range may be obtained from a single pixel. It is not necessary to have three pixels or three filters to achieve the desired color on the display. The present invention also provides improved grey scale control through the use of a modulated short pulse excitation. Pulse modulation of the applied voltage may be used to improve the temporal response of the surface plasmon display and to provide grey scale control.

The display of the present invention has a wide viewing angle because the surface plasmon display is based upon scattered light originating from the viewing surface itself. Optical coupling to the liquid crystal is achieved through evanescent waves in a fraction of a wavelength. Thus, the thickness of the liquid crystal layer 18 is not critical.

Heat generated by the light sources is a potential problem because of the increase in temperature of the liquid crystal. Because the undesired light is reflected away from the metal layer 16 of the modulator device 10, heating is less of a problem from a design standpoint. In a flat panel color display, the prism 12 may present size problems as the size of the display increases. In such cases, a grating coupling may be used for excitation of the incident light in place of the prism.

The scattering efficiency is also increased by unavoidable surface roughness at the metal-liquid crystal interface 17 associated with the fabrication of the liquid crystal layer 18 on the metal layer 16. The interface 17 of the metal layer 16 and the liquid crystal layer 18 requires some oriented texture to produce alignment of the twisted nematic liquid crystal. The surface texture also effects the brightness and contrast of the resulting light. Surface roughness favorably enhances the brightness of the display. However, the rough surface may adversely effect the contrast ratio. Depending on the size and application of the display, the interface 17 texture may be varied for different applications to optimize the display performance.

The pixels 28 in the present invention (FIGS. 1-2) are all identical and capable of producing red, green, and blue light. By utilizing one pixel 28 for all three primary colors instead of pixels dedicated to one specific color, the design and manufacturing process is simplified. The need for color filters is eliminated. The effective size of the pixel may also be reduced. Only one polarizing layer and one transparent conducting layer are required for color transmission in the present invention, thereby increasing optical transmission.

The color modulator 32 and the associated electronic circuitry 52 may utilize various control systems and voltage signals to control the color by changing the dielectric constant of the liquid crystal layer 18. The voltage amplitude may be varied to address the arrays of electrodes 20, 21. Modulation pulses may also be used to control the color signals. The response time of the liquid crystal layer 18 must be fast enough to permit the pixels 28 to be addressed in rapid sequence to form the desired image.

It may be desirable in certain applications of the liquid crystal display with surface plasmon scattering to use a three color pixel arrangement to achieve better color response than a single pixel design. The three pixel configuration would use the same surface plasmon scattering techniques noted above, but each color would be controlled separately. The metal layer 16 could be a single layer of silver. It may also be preferable to use different metals for the metal layer 16. The red and green pixels could utilize silver as the metal layer, the layers of silver being of different thicknesses. The blue pixel could include an aluminum metal layer. The metals would be deposited in strips of metal, or other suitable means, to provide the array of conductors for formation of the desired size and number of pixels.

Separate red, green, and blue signals would be generated for the three corresponding pixel groups.

The surface plasmon flat panel display of the present invention is based on the wavelength sensitivity of the surface plasmon mode. The surface plasmon mode is a resonant electromagnetic mode associated with the interface 17 between a medium with a negative dielectric constant, such as the metal layer 16, and a medium with a positive dielectric constant, such as the liquid crystal layer 18. The surface plasmon mode is characterized by evanescent waves that have their peak value at the interface 17 and which decay exponentially into the two bounding media.

Excitation of the surface plasmon mode is determined by matching the wave vector of incident light in the prism to the wave vector of the surface plasmon mode. The incident wave vector is described as follows:

$$K_i = (2\pi/\lambda) n \sin \theta_i \qquad (\text{eq. 1})$$

where $K_i$ is the component of the incident light wave vector parallel to the prism interface, n is the index of refraction of the glass prism, $\lambda$ is the wavelength of the incident light, and $\theta_i$ is the incident angle at the base of the prism.

The surface plasmon wave vector is described as follows:

$$K_p = (2\pi/\lambda)\sqrt{(\epsilon_1)(\epsilon_2)/(\epsilon_1 + \epsilon_2)} \qquad (\text{eq. 2})$$

In the above equation 2, $K_p$ is the wave vector of the surface plasmon mode, and $\epsilon_1$ and $\epsilon_2$ are the dielectric constants of the two bounding media. The metal layer 16 has a dielectric constant $\epsilon_1$ which is less than zero and the liquid crystal layer 18 has a dielectric constant $\epsilon_2$ greater than zero.

Excitation of the surface plasmon mode is achieved when the following relationship is satisfied:

$$K_i = K_p \qquad (\text{eq. 3})$$

It follows that the following relationship is satisfied:

$$K_p > (2\pi/\lambda)\sqrt{\epsilon_2} \qquad (\text{eq. 4})$$

The light wave in the liquid crystal is evanescent and hence can be excited only by prism or grating coupling. For fixed values of the dielectric constants, equations 3 and 4 can be met for only a single value of the incident light angle $\theta_i$.

Excitation of different wavelengths normally requires retuning of the angle of incidence. But if the dielectric constant of the liquid crystal layer 18 is voltage tunable, the equation may be satisfied at a fixed angle throughout the entire visible spectrum for an appropriate choice of metal and liquid crystal. Consequently, the prism 12 may be anchored in a fixed position for a flat panel display and the color projected from the color modulator 10 may be varied by applying a voltage signal to the layer of liquid crystal 18 to change the dielectric constant.

Figure 7:
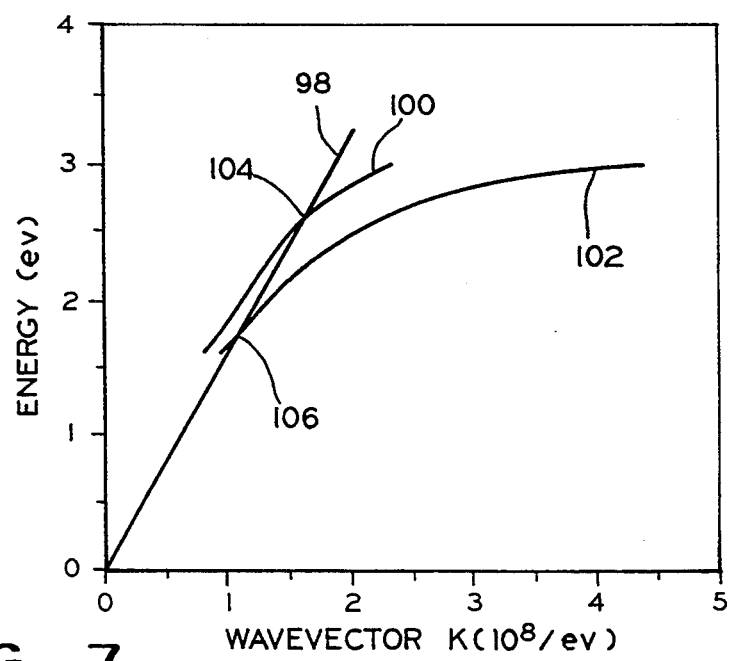
FIG. 7 is a graph showing the dispersion plots, the straight line representing the dispersionless prism at a fixed incident angle and the two curved lines representing the dispersion of the surface plasmon mode resulting rom the dispersion characteristics of metals in the visible parts of the spectrum and the birefringence of the liquid crystal medium.

Dispersion plots of w versus $K_p$ are calculated by means of Equation 1 for the prism and Equation 2 for the surface plasmon mode. In FIG. 7, the straight line 98 is the dispersion plot for a dispersionless prism and a fixed incident angle per Equation 2. The dispersion plot 100 of Eq. 1 results from the dispersion characteristics of metals in the visible part of the spectrum. The intersection 104 of the prism dispersion plot 98 and the metals dispersion plot 100 determines the frequency $w_{sp}$ of the surface plasmon mode in the excited state.

If the dielectric function ($\epsilon_2$) of the liquid crystal layer 18 is decreased by applying a voltage across the liquid crystal layer 18, then the dispersion curve for the surface plasmon mode shifts to curve 102 in FIG. 7. The intersection 106 of the prism dispersion plot 98 and the new metals dispersion plot 102 determine a new frequency $w_{sp}$, of the surface plasmon mode. By tuning the voltage applied to the liquid crystal layer 18, the frequency of the excited surface plasmon mode may be varied.

The application of the surface plasmon mode to flat panel display technology is based on the electromagnetic field properties of the surface plasmon mode. When the mode is excited, the amplitude of the electric field increases exponentially as measured in the direction from the base 14 of the prism 12 through the metal film 16 to the metal-liquid crystal interface 17. It is the scattering of the enhanced field amplitude from the surface roughness at the metal-liquid crystal interface 17 that produces the scattered light 34 to be seen by the viewer of the display surface 24.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A display assembly comprising:
  a) a source of polarized incident white light;
  b) coupling means for matching a wave vector of incident light in said coupling means to a wave vector of a surface plasmon mode, said coupling means being positioned in a light coupling relationship to said source at an angle of incidence for excitation of the surface plasmon mode;
  c) a layer of medium having a negative dielectric constant formed on a surface of said coupling means, said negative dielectric constant medium providing desired dispersion properties in the surface plasmon mode;
  d) a layer of medium having a positive dielectric constant formed on said layer of negative dielectric medium, said layers of medium forming an interface capable of supporting the surface plasmon mode, the interface being positioned to receive incident light at the angle of excitation of the surface plasmon mode such that a portion of the incident light is selectively absorbed and scattered, and the balance of the incident light is reflected away from the interface;
  e) an outer transparent panel positioned parallel to said layers of medium for display of the light scattered at the interface; and
  f) control means for defining a matrix of variable color pixels on said positive dielectric medium, said control means including a controller for selectively controlling the dielectric constant of said positive dielectric medium at each pixel in the matrix by transmitting voltage signals to each pixel, which controls the wavelength of the incident light for excitation of the surface plasmon mode, including the color of the incident light that is reflected and the color of the incident light that is scattered from the interface at each pixel to said outer panel to form a color picture.

2. The display assembly defined in claim 1 wherein said layer of medium having a positive dielectric constant is a layer of liquid crystal material.

3. The display assembly defined in claim 1 wherein said layer of medium having a negative dielectric constant is a layer of metal material.

4. The display assembly defined in claim 2 wherein said means for controlling the dielectric constant includes a first planar array of parallel linear electrodes formed in said layer of negative dielectric medium on one side of said layer of liquid crystal material and a corresponding second array of parallel linear transparent electrodes on the opposite side of said layer of liquid crystal, the second array of transparent electrodes positioned in a parallel plane and perpendicular to the first array of electrodes, said first and second arrays of electrodes defining a matrix of pixels on said layer of liquid crystal, and a color controller for selectively transmitting voltage signals between corresponding electrodes of the first and second arrays for varying the dielectric constant of the layer of liquid crystal at each of the color pixels, which controls the wavelength of the incident light for excitation of the surface plasmon mode, including the color of the incident light that is reflected and the color of the incident light that is scattered from the interface at each color pixel.

5. A display assembly comprising:
  a) a source of polarized incident white light;
  b) coupling means for matching a wave vector of incident light in said coupling means to a wave vector of a surface plasmon mode, said coupling means being positioned in a light coupling relationship to said source at an angle of incidence for excitation of the surface plasmon mode;
  c) a layer of metal formed on a surface of said coupling means, said layer of metal providing desired dispersion properties in the surface plasmon mode;
  d) a layer of liquid crystal formed on said layer of metal, said layer of metal and said layer of liquid crystal forming an interface capable of supporting a surface plasmon mode, the interface being positioned to receive incident light at the angle of excitation of the surface plasmon mode such that a portion of the incident light is selectively absorbed and scattered, and the balance of the incident light is reflected away from the interface;
  e) an outer transparent panel positioned parallel to said layer of metal and said layer of liquid crystal for display of the light scattered at the interface; and
  t) control means for defining a matrix of variable color pixels on said positive dielectric medium, said control means including a controller for selectively controlling the dielectric constant of said layer of liquid crystal at each pixel in the matrix by transmitting voltage signals to each pixel to control the wavelength of the incident light for excitation of the surface plasmon mode, including the color of the incident light that is reflected and the color of the incident light that is scattered from the interface at each pixel to said display means to form a color picture.

6. The display assembly defined in claim 5 wherein said coupling means includes a prism, said layer of metal and said layer of liquid crystal being formed on the hypotenuse of said prism.

7. The display assembly defined in claim 5 wherein said coupling means includes a diffraction grating.

8. The display assembly defined in claim 5 wherein said coupling means includes a wave guide structure.

9. The display assembly defined in claim 5 wherein said layer of metal includes a layer of silver.

10. The display assembly defined in claim 5 wherein said layer of metal includes a layer of aluminum.

11. The display assembly defined in claim 5 wherein said layer of metal includes a combination of linear silver conductors and linear aluminum conductors to form electrodes positioned in a specified pattern of pixels, the silver segments designed to control the scattering of red and green light, and the aluminum segments designed to control the scattering of blue light.

12. The display assembly defined in claim 5 wherein said outer panel includes a glass substrate having a tinted coating.

13. The display assembly defined in claim 5 wherein said means for controlling the dielectric constant includes a first array of parallel linear electrodes formed in said layer of metal adjacent one side of said layer of liquid crystal, and a corresponding second array of parallel linear transparent electrodes adjacent the opposite side of said layer of liquid crystal, the second array of linear transparent electrodes positioned in a parallel plane and perpendicular to the first array of linear electrodes, said first and second arrays of electrodes defining a matrix of pixels on said layer of liquid crystal, and said means for controlling including a controller for selectively transmitting voltage signals between corresponding electrodes of the first and second arrays through a selected position on said layer of liquid crystal material whereby the voltage signals to the electrodes determines the color of light scattered through each of the pixels to said outer panel.

14. The display assembly defined in claim 13 wherein said controller utilizes modulation pulses to control the color of the light scattered through each of the pixels.

15. The display assembly defined in claim 13 wherein said controller transmits three separate voltage signals for red, green, and blue color to a single pixel whereby a single pixel may represent any color in a color light spectrum.

16. The display assembly defined in claim 13 wherein the pixels defined on said layer of liquid crystal are arranged in an array of red, green, and blue pixels, each pixel receiving a separate voltage signal from the controller, whereby a color picture is formed by the combination of red, green, and blue pixels.

17. The display assembly defined in claim 11 wherein said means for controlling the dielectric constant includes an array of transparent electrodes positioned between said layer of liquid crystal and said display means, the array of electrodes, the silver conductors, and the aluminum conductors defining a matrix of pixels on said layer of liquid crystal, and a controller for selectively transmitting voltage signals through the layer of liquid crystal material whereby the color of light scattered at each of the pixels is determined by said metal conductors and the voltage signals to the electrodes.

* * * * *